United States Patent
McGary (10) Patent No.: US 8,189,564 B2
(45) Date of Patent: May 29, 2012

(54) SYSTEM AND METHOD FOR FACILITATING VOIP COMMUNICATIONS

(75) Inventor: Faith McGary, Bethlehem, PA (US)

(73) Assignee: Grape Technology Group, Inc., Bethlehem, PA (US)

( * ) Notice: Subject to any disclaimer, the term of this patent is extended or adjusted under 35 U.S.C. 154(b) by 127 days.

(21) Appl. No.: 11/586,487

(22) Filed: Oct. 24, 2006

(65) Prior Publication Data

US 2007/0133525 A1 Jun. 14, 2007

Related U.S. Application Data

(60) Provisional application No. 60/729,813, filed on Oct. 24, 2005.

(51) Int. Cl.
*H04L 12/66* (2006.01)
(52) U.S. Cl. ........ 370/352; 370/353; 370/354; 370/389; 370/401; 370/395.3
(58) Field of Classification Search .................. 370/356, 370/352, 401; 379/88.11, 88.13, 88.17, 218.01, 379/218.02
See application file for complete search history.

(56) References Cited

U.S. PATENT DOCUMENTS

| | | | |
|---|---|---|---|
| 7,227,941 B2 * | 6/2007 | Baumeister et al. | 379/218.01 |
| 7,263,095 B1 * | 8/2007 | Sarkar | 370/352 |
| 7,269,162 B1 * | 9/2007 | Turner | 370/352 |
| 2004/0125931 A1 | 7/2004 | Archer | |
| 2005/0201364 A1 * | 9/2005 | Dalton et al. | 370/352 |
| 2006/0067307 A1 * | 3/2006 | Dalton et al. | 370/352 |
| 2006/0083222 A1 * | 4/2006 | Miyajima et al. | 370/352 |
| 2006/0155998 A1 * | 7/2006 | Dalton et al. | 713/172 |
| 2007/0058613 A1 * | 3/2007 | Beckemeyer | 370/352 |
| 2007/0058616 A1 * | 3/2007 | Li | 370/352 |

OTHER PUBLICATIONS

RFC 3261, Rosenberg et al, SIP, Jun. 2002, all pages.*
Search Report dated Sep. 3, 2008.

* cited by examiner

*Primary Examiner* — Joseph J Nguyen
(74) *Attorney, Agent, or Firm* — Sofer & Haroun, LLP (57) ABSTRACT

A method for facilitating VoIP communication between VoIP providers. First and second VoIP service providers are registered with a VoIP communication system, which generates a table of registered VoIP subscribers from the first and second VoIP service providers. The information from the table is applied to a call generated from a subscriber on the first VoIP service provider, such that if the desired party is a subscriber to the second VoIP service provider as noted in the table, the call generated from the subscriber on the first VoIP service provider is sent to the desired party as a packet switched call.

5 Claims, 12 Drawing Sheets

| Method | Request purpose |
|---|---|
| INVITE | Invite users to participate in a session |
| ACK | Used to acknowledge the final response to an INVITE |
| OPTIONS | Queries a server or user agent about its capabilities |
| CANCEL | Cancel pending transaction(s) |
| BYE | Used to terminate a session |
| REGISTER | Informs a server about a user's location |
| SUBSCRIBE | Used in asynchronous event notification. Declare interest in a particular event |

| Method | Request purpose |
|---|---|
| NOTIFY | Used in asynchronous event notification after issuing a SUBSCRIBE. Requests are sent containing information about the session |
| PUBLISH | Upload status information to a server |
| REFER | Provides session transfer functionality. Instructs user agent to act upon a URI |
| MESSAGE | Used for text messaging |
| UPDATE | Update session state information |
| PRACK | Provisional Response ACK. Useful for placing the caller into a queue |
| INFO | Used for mid-session information that doesn't affect state. |
| COMET | PreCOnditions MET: used to indicate that are preconditions are met and a session can be established. |
| DO | Used to carry commands |

| RANGE | Response Class |
|---|---|
| 100-199 | Informational |
| 200-299 | Success |
| 300-399 | Redirection |
| 400-499 | Client Error |
| 500-599 | Server Error |
| 600-699 | Global Failure |

| URI Schema | Use |
|---|---|
| sip | Standard SIP |
| sips | Secure SIP |
| tel | Telephone number or dial string |
| pres | Presence resource |
| im | IM resource |
| http | Web page |
| h323 | H323 protocol |

| Destination VoIP Number | Name of VoIP Service Provider. | Extension Address for VoIP Service Provider. |
|---|---|---|
| XXX-XXX-XXXX | VoIP Provider A | XXXXXXXXXX@PROVIDER A |
| XXX-XXX-XXXX | VoIP Provider A | XXXXXXXXXX@PROVIDER A |
| XXX-XXX-XXXX | VoIP Provider A | XXXXXXXXXX@PROVIDER A |
| XXX-XXX-XXXX | VoIP Provider A | XXXXXXXXXX@PROVIDER A |
| XXX-XXX-XXXX | VoIP Provider B | XXXXXXXXXX@PROVIDER B |
| XXX-XXX-XXXX | VoIP Provider B | XXXXXXXXXX@PROVIDER B |
| XXX-XXX-XXXX | VoIP Provider B | XXXXXXXXXX@PROVIDER B |
| XXX-XXX-XXXX | VoIP Provider B | XXXXXXXXXX@PROVIDER B |
| XXX-XXX-XXXX | VoIP Provider C | XXXXXXXXXX@PROVIDER C |

SYSTEM AND METHOD FOR FACILITATING VOIP COMMUNICATIONS

RELATED APPLICATION

This application is related to and claims the benefit of priority from Provisional Patent Application No. 60/729,813, filed on Oct. 24, 2005, the entirety of which in incorporated herein by reference.

FIELD OF THE INVENTION

The present invention is related to VoIP communications. More particularly, the present invention is related to VoIP communications over private a private network with directory assistance services.

BACKGROUND

In the area of VoIP (Voice Over Internet Protocol) communications, prior art arrangements between a caller using a first VoIP provider to a called party using a second VoIP provider at some point travel over the PSTN (Public Switched Telephone Network).

Figure 1:
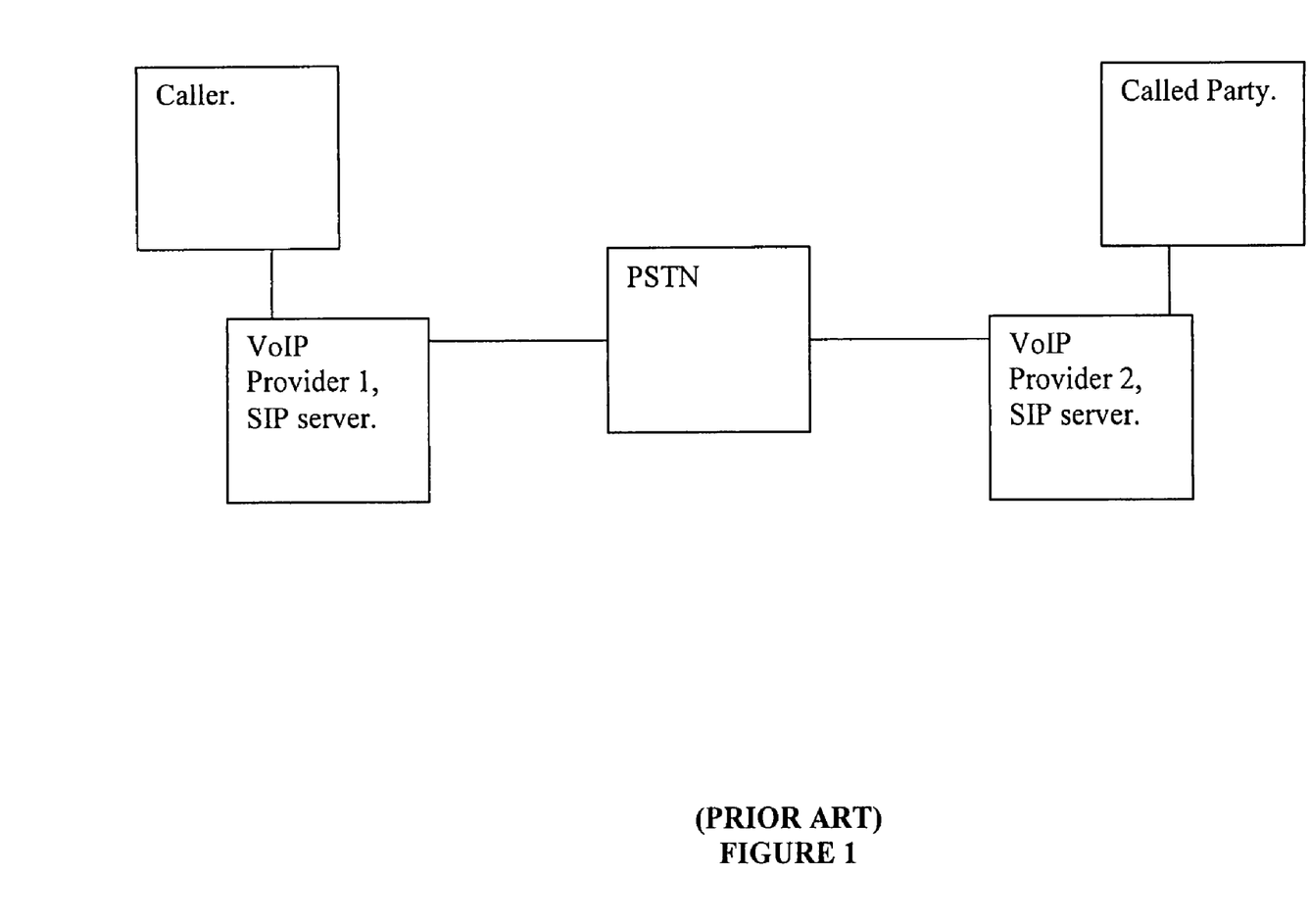
FIG. 1 is a prior art illustration of a two way VoIP communication between two different VoIP service providers.

For example, as shown in FIG. 1, when a caller dials the number of a called party on a different VoIP provider network, the call is first routed to the SIP (Session Initiation Protocol) server of the caller's VoIP provider. The call is then routed to the SIP server of the called party's VoIP provider via the PSTN. However, such communications may require additional usage fees (tolls) or other applicable costs, in some way defeating the purpose of using packet switched VoIP communications.

OBJECT AND SUMMARY

The present invention looks to overcome the drawback associated with the present invention and provide a system and method for facilitating VoIP communications from a first VoIP service provider to a second VoIP service provider without using the PSTN.

Another object of the present invention, in addition to providing non-PSTN VoIP communication throughput between providers, is to further provide directory assistance to VoIP callers where the VoIP service is directly coupled to the VoIP provider(s) such that the initial directory assistance call does not need to travel over the PSTN before being serviced.

To this end, the present invention is directed to a method for facilitating VoIP communication between VoIP providers. First and second VoIP service providers are registered with a VoIP communication system, which generates a table of registered VoIP subscribers from the first and second VoIP service providers.

The information from the table is applied to a call generated from a subscriber on the first VoIP service provider, such that if the desired party is a subscriber to the second VoIP service provider as noted in the table, the call generated from the subscriber on the first VoIP service provider is sent to the desired party as a packet switched call.

BRIEF DESCRIPTION OF THE DRAWINGS

The present invention can be best understood through the following description and accompanying drawings, wherein.

DETAILED DESCRIPTION

Figure 2:
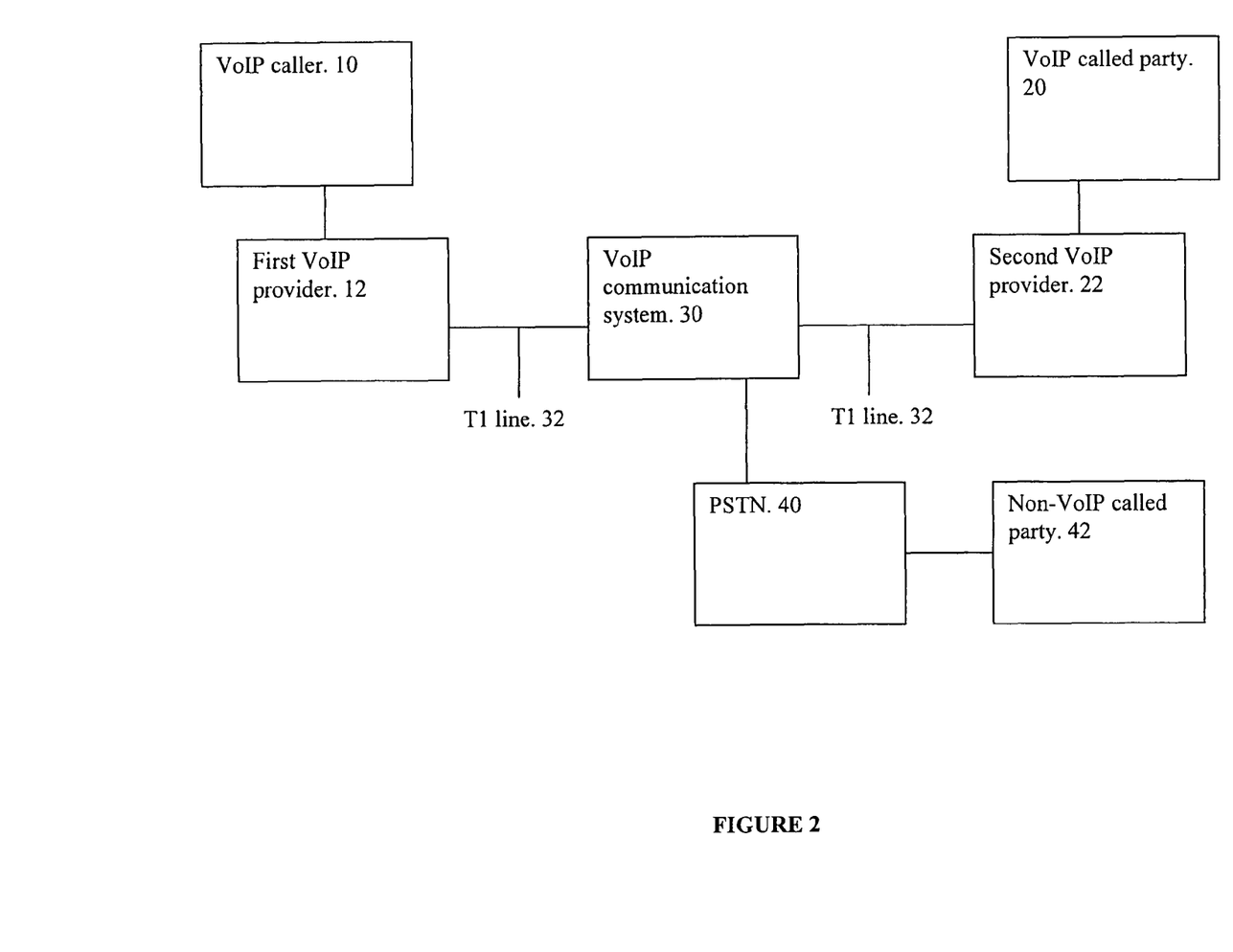
FIG. 2 illustrates an arrangement for a VoIP communications system between first and second VoIP providers, in accordance with one embodiment of the present invention.

In one embodiment of the present invention as illustrated in FIG. 2, an arrangement is shown for VoIP communications between a first VoIP caller 10 using a first VoIP provider 12 and a called party 20 using a second VoIP provider 22. According to the present invention, VoIP communications system 30 is located between first VoIP provider 12 and second VoIP provider 22, such that system 30 is coupled directly to providers 12 and 22 using high capacity telecommunications lines 32 (e.g. T1 lines etc. . . . ).

For the purposes of illustration, caller 10 and called party 20 are assumed to be using VoIP telephones, however, it is understood that they may be using any VoIP enabled electronic device including PDAs (Personal Digital Assistants) or PCs (Personal Communications).

For completeness, VoIP communications system 30 is further coupled to PSTN 40 so that if a desired called party is not handled by a second VoIP provider 22 that is coupled to system 30 (non-VoIP called party 42), the call may still be completed. However, for the purposes of illustration, the following discussion of the salient features of the present invention deal with communications between first and second VoIP service providers 12 and 22.

During typical VoIP communications it is understood that first VoIP service provider 12, second VoIP service provider 22, and VoIP communications system 30 utilize typical SIP (Session Initiation Protocol) servers and connectivity protocols for handling the VoIP communications.

To summarize, SIP protocol is a signaling protocol used for establishing VoIP sessions as per the RFC (Request for Comment serial # RFC 3261) from the Internet Engineering Task Force (IETF). These sessions can be to a single or multiple participants. The SIP request-response protocol closely resembles HTTP (Hypertext Transfer Protocol) and SMTP (Short Message Transport Protocol) and may be used to initiate voice, video and instant messaging sessions. SIP may include user location services, communication session establishment, session participant management and limited feature establishment.

Figure 3:
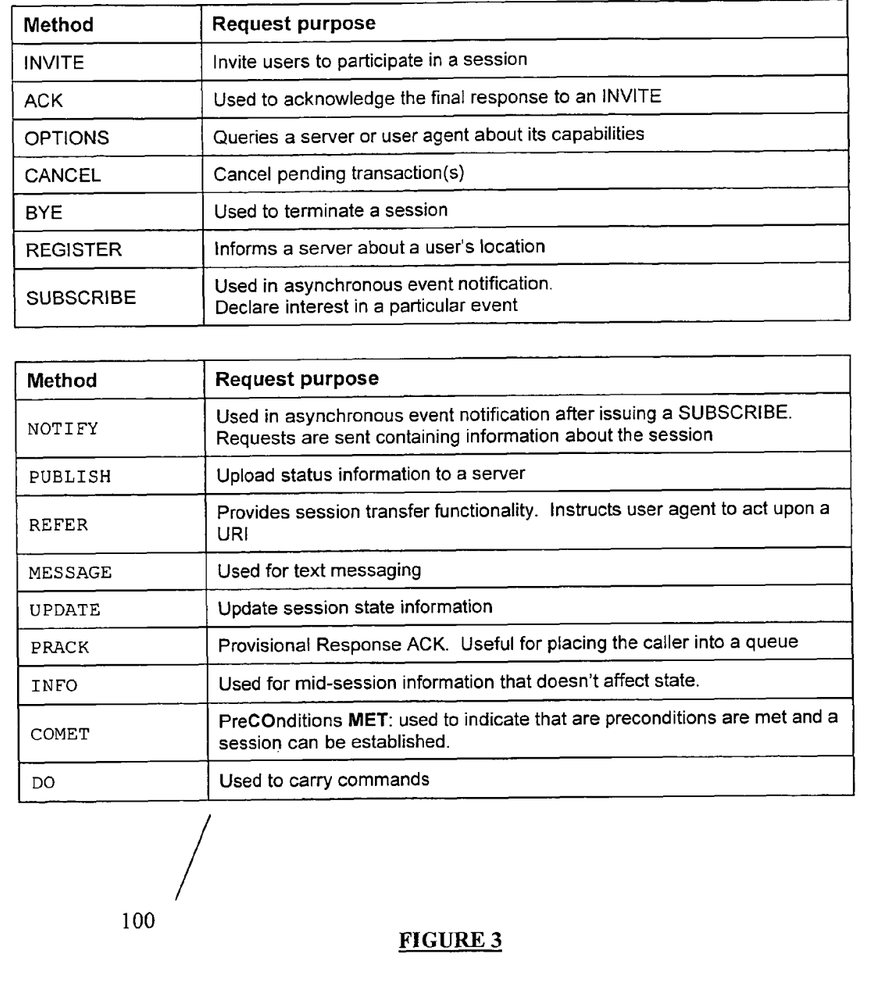
FIG. 3 illustrates an SIP methodology table, in accordance with one embodiment of the present invention.
Figure 4:
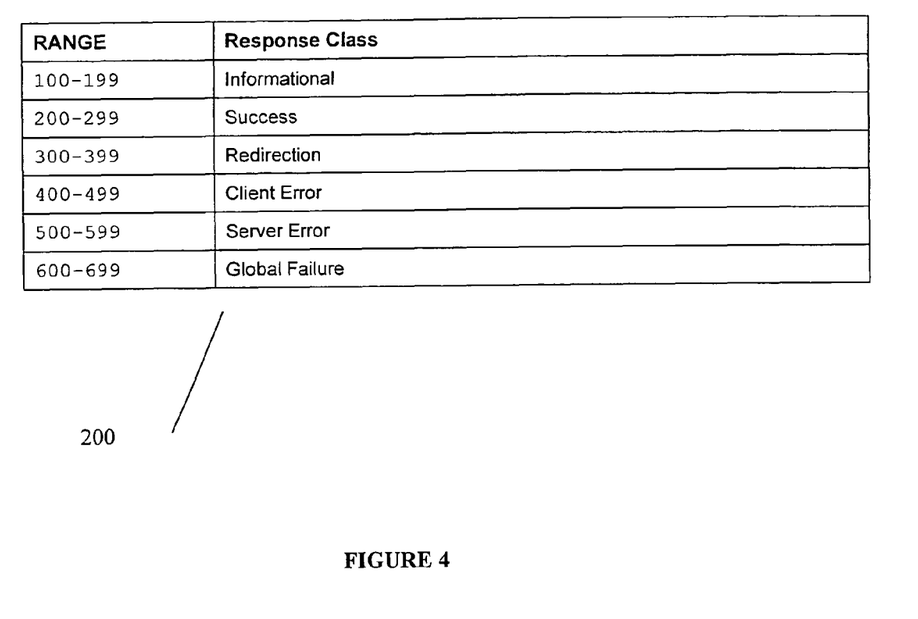
FIG. 4 illustrates an SIP response table in accordance with one embodiment of the present invention.
Figure 5:
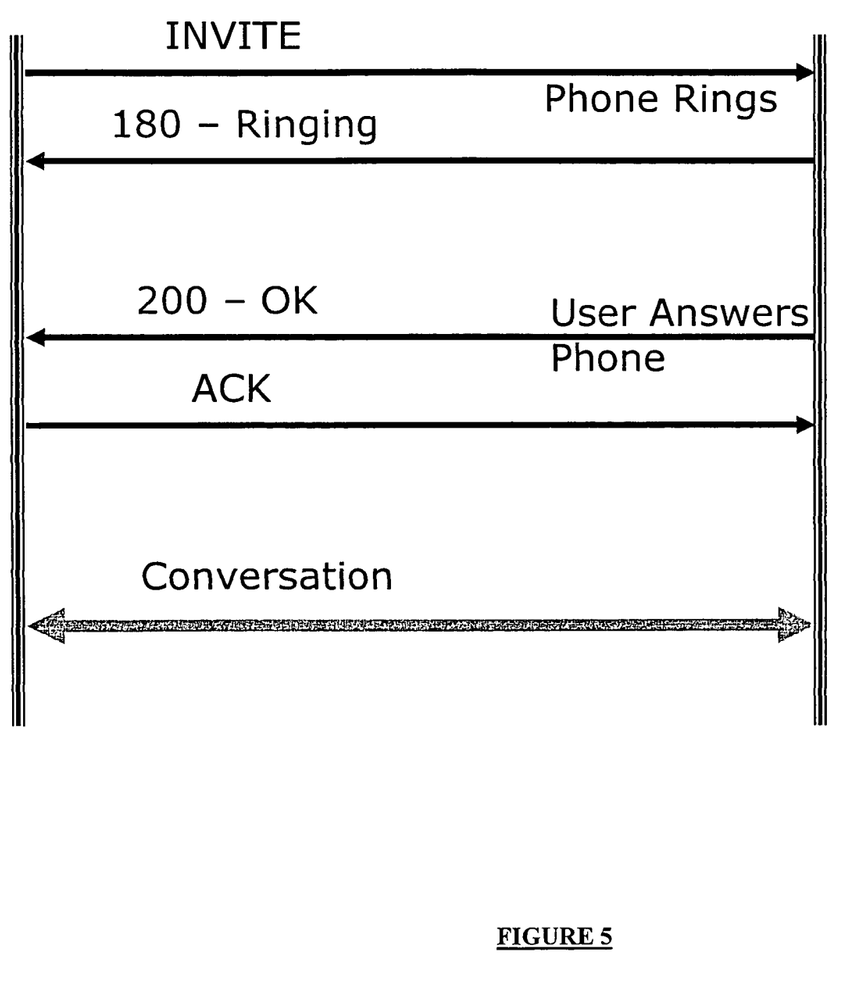
FIG. 5 illustrates an SIP call flow (for VoIP communications), in accordance with one embodiment of the present invention.

As illustrated in FIG. 3, SIP methodology employs a number of session initiation task communications as shown in table 100. Typical SIP responses may include status code identifiers in the range 100-600 as noted in table 200 shown in FIG. 4. A sample SIP session for VoIP phones is shown in FIG. 5.

Thus example SIP VoIP message could be as follows:

| SIP - Example SIP Message |
|---|
| INVITE sip:wh@200.201.202.203 SIP/2.0 |
| Via: SIP/2.0/UDP proxy.munich.de:5060;branch=z9hG4bK8542.1 |
| Via: SIP/2.0/UDP 100.101.102.103:5060;branch=z9hG4bK45a35h76 |
| Max-Forwards: 69 |
| To: Heisenberg <sip:w.heisenberg@munich.de>= |
| From: E. Schroedinger <sip:schroed5244@aol.com>;tag=312345 |
| Call-ID: 105637921@100.101.102.103 |
| CSeq: 1 INVITE |
| Contact: sip:schroed5244@100.101.102.103 |
| Content-Type: application/sdp |
| Content-Length: 159 |
| v=0 |
| o=Tesla 289084526 28904529 IN IP4 lab.high-voltage.org |
| s=- |
| c=IN IP4 100.101.102.103 |
| t=0 0 |
| m=audio 49170 RTP/AVP 0 97 98 |
| a=rtpmap:0 PCMU/8000 |
| a=rtpmap:97 iLBC/8000 |
| a=rtpmap:98 telephone-event/8000 |

SIP typically employs basic components of a: 1) user agent, in this case VoIP phone of caller 10 and called party 20, and 2) an SIP server, illustrated in the present example as first and second VoIP providers 12 and 22. An SIP user agent has a User Agent Client (UAC) for initiating sessions and a User Agent Server (UAS) responds to session requests.

SIP Servers are used in registrar server roles, proxy server roles and redirect server roles. As proxy servers they may accept requests from user agents, query the registrar servers for destination user agent's address information, and forward the request to the destination user agent.

It is understood that the VoIP communications of the present invention are discussed in relation to SIP signaling protocol for first and second VoIP providers 12 and 22 and system 30, however, the invention is not limited in this respect. Any comparable or supplemental signaling protocol for VoIP packet switched communications, such as SDP (Session Description Protocol) or RTP (Real-Time Transport Protocol), used between different VoIP networks that employs a similar system 30 without connectivity through the PSTN, is within the contemplation of the present invention.

Figure 6:
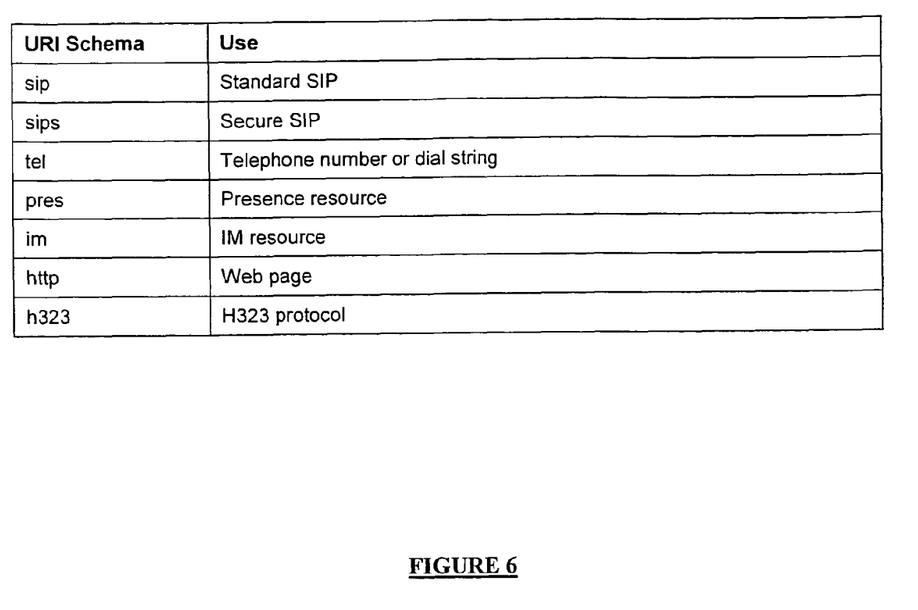
FIG. 6 illustrates an SIP URI schema table, in accordance with one embodiment of the present invention.

SIP-URI or Uniform Resource Indicators are used in SIP communications to address SIP communications. URI uses the format of an e-mail address (sip:user@domain or sip:user@ipaddress). Table 300 in FIG. 6 shows a typical URI schema chart and the associated use within SIP sessions.

Thus, according to one embodiment of the present invention, VoIP communications from caller 10 on first VoIP provider 12 to called party 20 on second VoIP provider 22 employ SIP protocol for connectivity via system 30 according to the following. The following discussion of VoIP transmissions are unless otherwise specified, handled as SIP protocol sessions.

Figure 7:
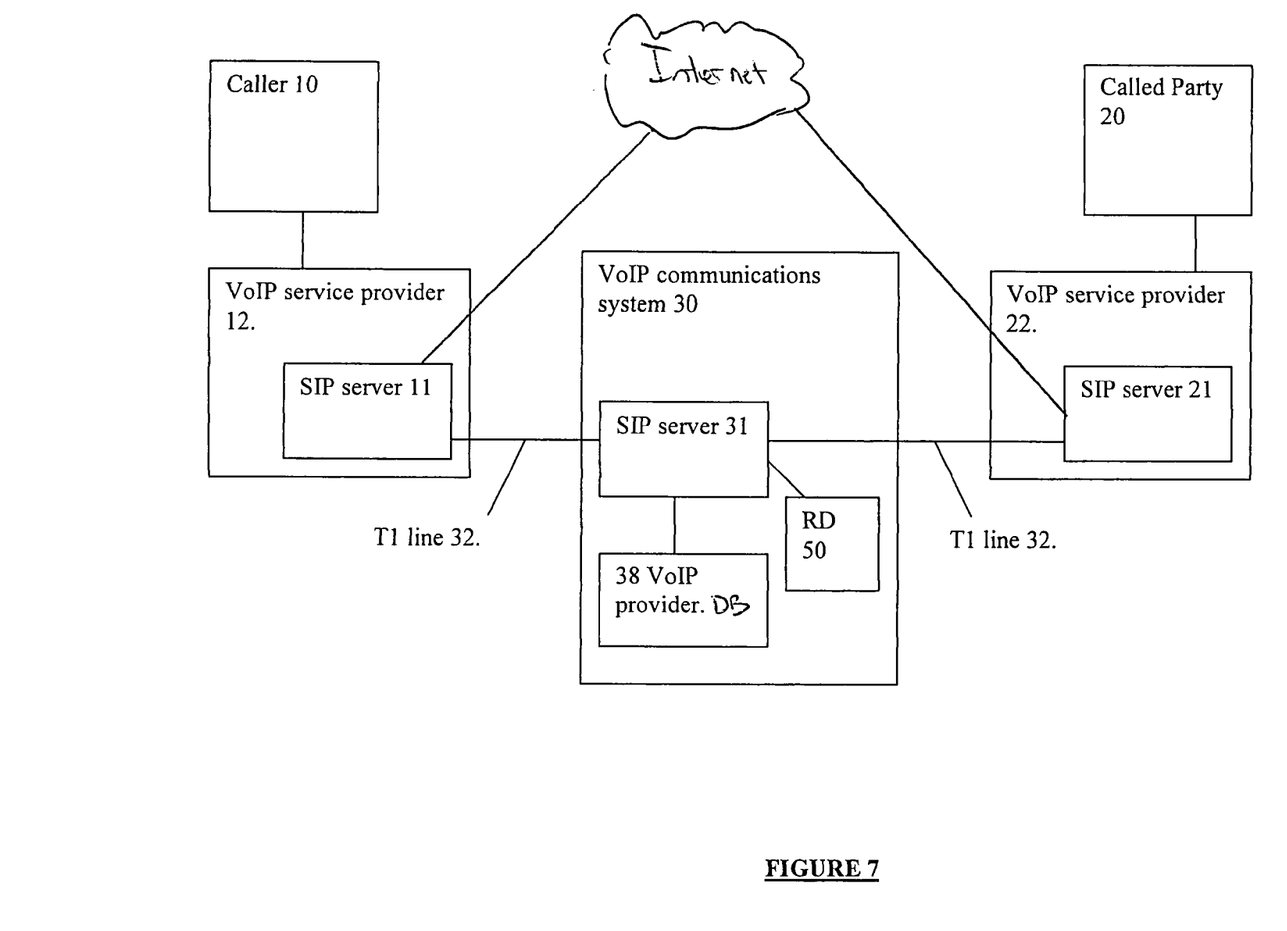
FIG. 7 illustrates an arrangement for a VoIP communications system between first and second VoIP providers as shown in FIG. 2, in accordance with one embodiment of the present invention.

In one embodiment of the present invention, as illustrated in FIG. 7, initially, or after any system update, an SIP server 31 situated in system 30, may connect to various SIP servers of VoIP service providers utilizing the connectivity of the present invention. For example, upon set up, SIP server 31 of system 30 may set up/log on to communication pathways over T1 line 32 to an SIP server 11 on first VoIP provider 12 and an SIP server 21 at second VoIP provider 22.

In this first arrangement, once SIP server 31 is registered with at least two SIP provider servers 11 and 21, system 30 requests and/or is delivered a list of VoIP subscribers, including their VoIP telephone numbers and their corresponding service provider.

Figure 8:
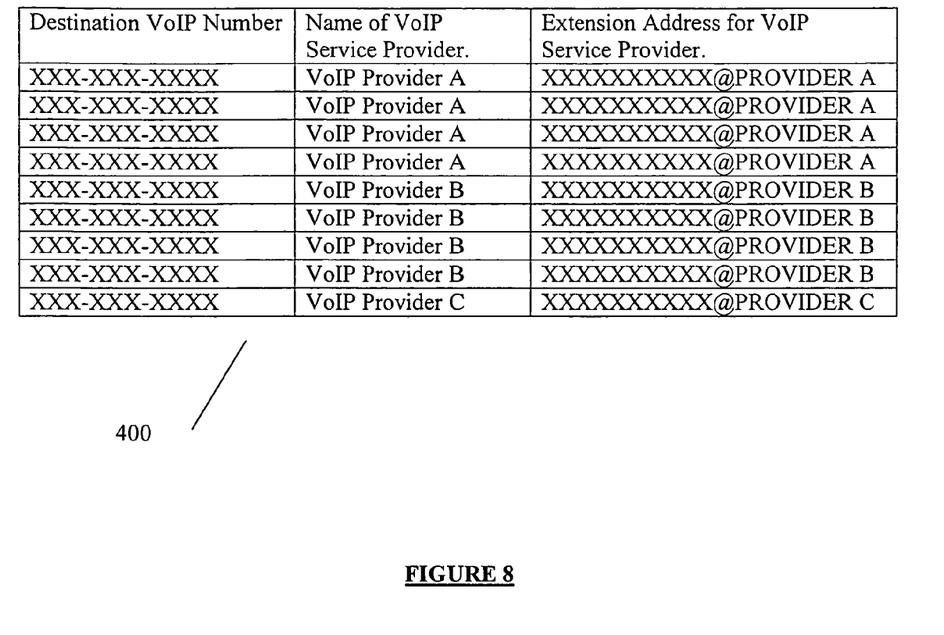
FIG. 8 illustrates a VoIP provider table, in accordance with one embodiment of the present invention.

For example, first service provider 12 sends a list or table of all VoIP subscribers, such as caller 10, to system 30. Likewise, second service provider 22 sends a list or table of all VoIP subscribers, such as called party 20, to system 30. Once all participating service providers 12 and 22 send their information to system 30, a table 400 of VoIP enabled call destinations supported by system 30 is established as shown in FIG. 8. This table 400 is stored in VoIP provider database 38.

In a first arrangement table 400 may be contacted (dipped) each time a call is placed from caller 10 on provider 12 to see if the desired party 20 is on another network 22 affiliated with system 30. Table 400 simply includes a list of telephone numbers that are VoIP phones that are on VoIP service provider networks (eg. 12 and 22) that are coupled to system 30.

Alternatively, table 400 may be communicated to service providers 12 and 22 for internal use, with periodic updates being provided by system 30. In this arrangement, after registration of the various VoIP service providers 12 and 22, and others if available, a version of table 400 is sent to each service provider to be stored in their respective SIP servers 11 and 21 (or in some database accessible by these serves) including VoIP destinations on the other service providers attached to system 30.

For example, in the case of VoIP service provider 12, table 400 delivered to SIP server 11, includes the VoIP destinations on second VoIP network 22. A similar table 400 would be sent to service provider 22 showing available VoIP call destinations on the network of service provider 12.

Charges for the use of system 30 would be based on the arrangement of how table 400 is used by VoIP service providers 12 and 22. For example, if table 400 is stored on system 30 and is dipped for each call, then the charge may be charged on a per call basis. If table 400 is sent to VoIP providers 12 or 22, then they may be charged initially on a royalty basis and possibly on updates to chart 400 as other providers are added.

It is understood that regardless of whether table 400 is sent to VoIP service providers or left in VoIP provider database 38 for dipping by service providers 12 and 22, it may include VoIP call destinations of as many service providers as are coupled to system 30.

Figure 9:
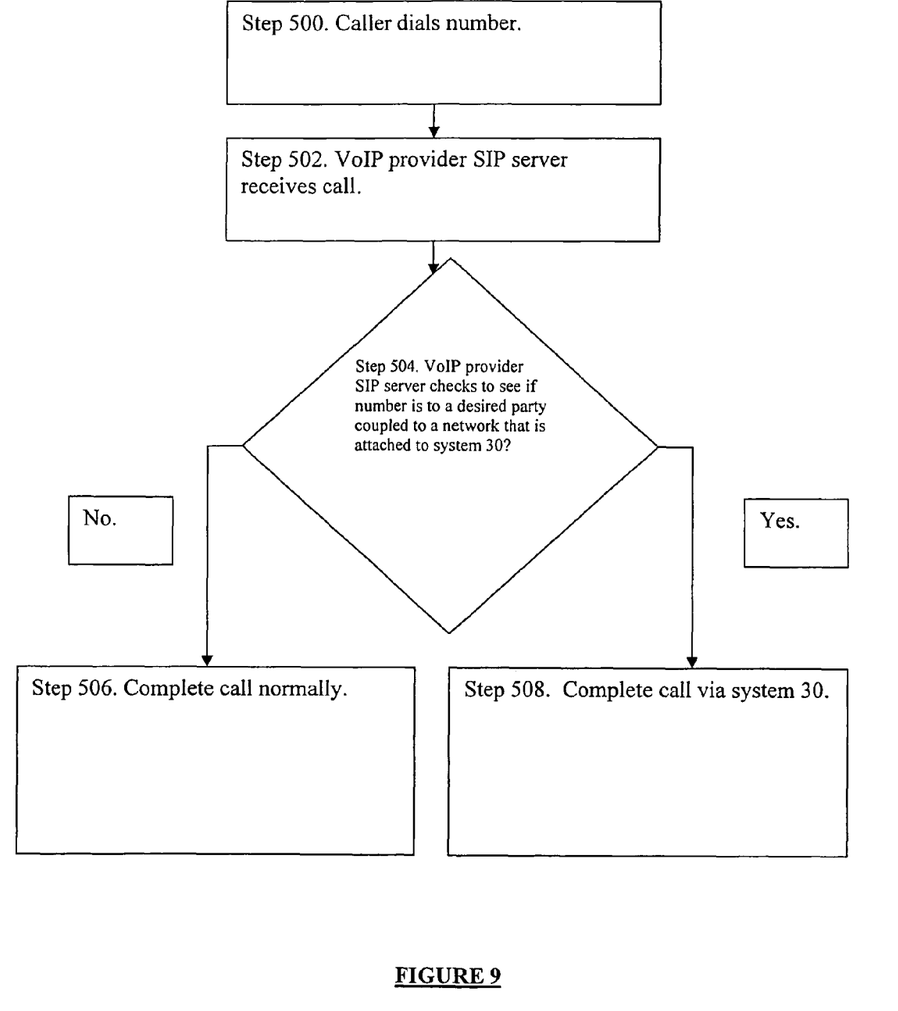
FIG. 9 is a flow chart for a call from a first VoIP provider to a second VoIP provider on the system as shown in FIG. 7, in accordance with one embodiment of the present invention.

As illustrated in flow chart FIG. 9, step 500 caller 10 dials a telephone number of a desired party 20 thereby initiating an SIP session according the above description. At step 502, the call is forwarded to the SIP proxy server 11 of first VoIP service provider 12.

In accordance with one embodiment of the present invention, at step 504, server 21 compares the dialed number against either their stored version of table 400 or they dip table 400 on database 38 at system 30 to see if the destination phone number belongs to a subscriber on the network of second VoIP provider 22 or some other VoIP provider network attached to system 30. If not, at step 506, the call is routed to the destination through normal channels.

However, if the destination phone number of called party 20 is a member of the network of second VoIP service provider 22, coupled to system 30, then at step 508, the call is continuously is routed as a packet switched communication over lines 32 to either system 30, acting as a node on the network path, or directly to the SIP server 21 of VoIP provider 22 for delivery to called party 20. The decision to send the call as a packet switched SIP communication through system 30 or directly from server 11 to sever 21 on the second provider network 22, may be based on the business arrangement between the providers and system 30

Thus, a communication between a caller 10 and called party 20 using different VoIP providers 12 and 22 may communicate in a complete packet switched arrangement without the call being sent via a dedicated PSTN 40 circuit. This saves on the associated tolls and taxes for using copper line PSTN. System 30 may keep appropriate records in a record database 50, shown in FIG. 7 for billing VoIP providers 12 and 22 accordingly for use/updates of table 400 and potentially the transport of calls between the networks.

Figure 10:
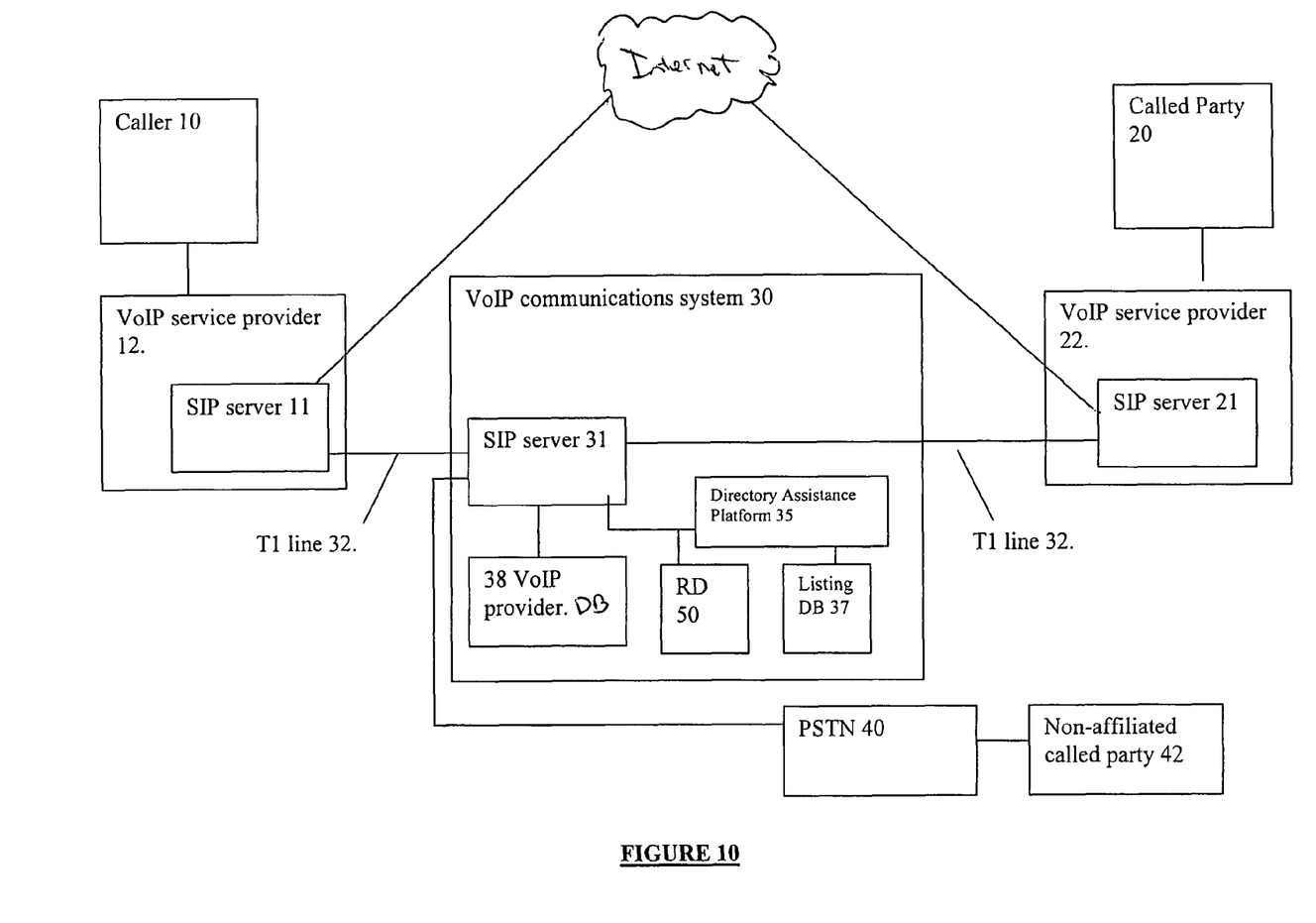
FIG. 10 illustrates an arrangement for a VoIP communications system between first and second VoIP providers as shown in FIG. 2, in accordance with another embodiment of the present invention.

In another embodiment of the present invention, as illustrated in FIG. 10, VoIP communications system 30 further includes a directory assistance platform 35. In this arrangement during the set up of system 30 with the SIP server 11 in first VoIP provider 12, system registers a EDAS URI (Enhanced Directory Assistance System (platform 35) URI address to direct VoIP caller 10 originating directory assistance calls through system 30, regardless of intended destination. Such URI may be "411," "118118" or other such numerical codes so that callers 10 dialing such numbers on their VoIP network 12 results in their call being sent to system 30.

Figure 11:
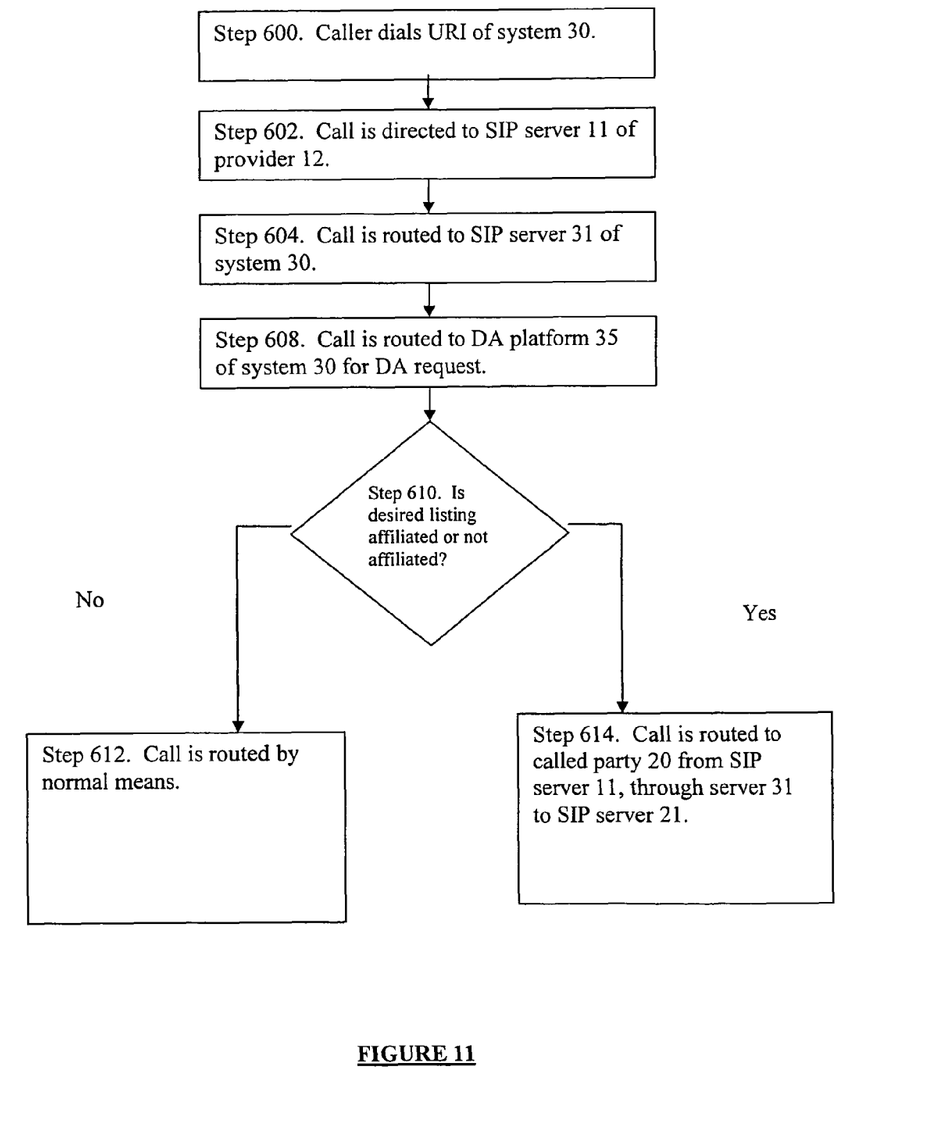
FIG. 11 is a flow chart for a call from a first VoIP provider to a second VoIP provider on the system as shown in FIG. 10, in accordance with one embodiment of the present invention.

In one embodiment of the present invention, as illustrated in flow chart FIG. 11, at a first step 600, caller 10 dials the system 30 URI initiating an SIP session as discussed in detail above. At step 602, SIP server 11 at first VoIP provider 12 receives the call, recognizes the URI of system 30 and directs it to SIP server 31. At step 604, the call is delivered to directory assistance platform 35 where either a live operator or automated customer service assistance system, receives the directory assistance call and initiates a database lookup in a listing database 37.

Figure 12:
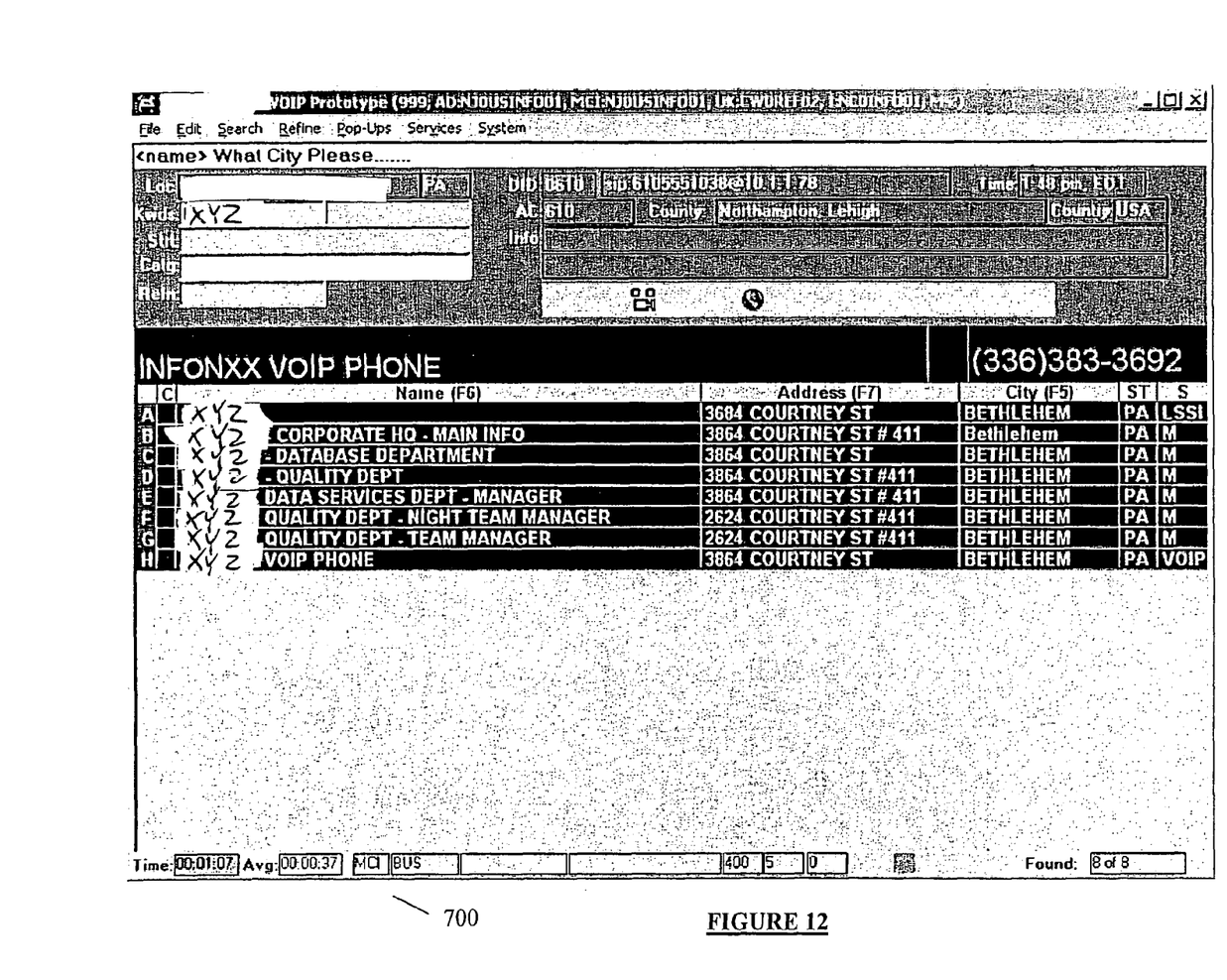
FIG. 12 is a screen shot of directory assistance system from flow chart FIG. 11, in accordance with one embodiment of the present invention.

In one embodiment of the present invention, as noted above, system 30 maintains table 400 in VoIP provider database 38 of VoIP subscribers that use VoIP networks coupled to system 30, such as first and second VoIP providers 12 and 22. Thus, at step 606, retrieved listings matching the request are displayed to the customer service agent at directory assistance platform 35. Screen shot 700 in FIG. 12 shows a display to the customer service agent with various responsive listings. Using the combined data of listing database 37 and VoIP provider database 38, listings showing connection to other VoIP networks are identified as such, along side non-VoIP network or other landline type listings.

At step 608, the caller selects the desired listing to be connected to, or, if one listing is on table 700, then caller 10 may select that listing. It is understood that any normal directory assistance services may additionally be provided, including additional searches if caller 10 does not receive a desired listing, additional listing services (reservations, additional information), directions, data push of the listing by SMS to the VoIP phone being used by caller 10 etc. . . . For the purposes of illustration, it is assumed that caller 10 is simply asking for an unknown number (that may be a VoIP number) and asking for connection to that number.

At step 610, the server 31 of system 30 checks whether the selected listing caller 10 desires to be connected to, is affiliated (such as called party 20) or a non-affiliated party 42. If not, then at step 612 the call is connected through ordinary means such as through PSTN 40. However, if the desired party is a called party 20 connected to second VoIP service provider 22, then system 30 connects the call via T1 communication line 30 from SIP server 11 through server 31 to SIP server 21, acting as a node on the packet switched communication.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A method for facilitating VoIP communication, between VoIP providers, said system comprising:
    providing an opportunity to a first VoIP service provider to register with a VoIP communication system;
    providing an opportunity to a second VoIP service provider to register with said VoIP communication system;
    generating a table of registered VoIP subscribers based on information provided from said first and second VoIP service providers, said table stored in a VoIP provider database;
    receiving a communication related to a VoIP subscriber on said first VoIP service provider seeking a desired listing via a directory assistance for a VoIP subscriber on said second VoIP service provider;
    retrieving said desired listing; and
    checking said desired listing against said table of registered VoIP subscribers from said first and second service providers and, if present on said table, delivering connection information for said registered VoIP subscriber to said first VoIP service provider allowing direct connection to said desired listing on said second VoIP service provider as a packet switched communication through said VoIP communication system and
    wherein said table is delivered to each of said first and second VoIP service providers for internal storage, such that said step of retrieving said desired listing includes dipping the table internally, and wherein said first and second VoIP service providers are charged on a royalty basis.

2. The method as claimed in claim 1, wherein said registering of said first and second VoIP providers includes sending a list of VoIP subscribers to said VoIP communication system.

3. The method as claimed in claim 1, further comprising the step of providing an opportunity for one or more VoIP service providers in addition to the first and second VoIP service providers to register with said VoIP communication system.

4. The method as claimed in claim 1, wherein said directory assistance provided to said VoIP subscriber further includes at least one additional feature selected from the group consisting of reservations services, directions or requested data push to a VoIP device.

5. The method as claimed in claim 1, wherein said first and second VoIP service providers are charged on updates to said chart as other providers are added.

* * * * *